July 10, 1934. E. W. McCONNELL, JR 1,966,353
METHOD OF CUTTING LAMINATED GLASS
Filed Feb. 16, 1931
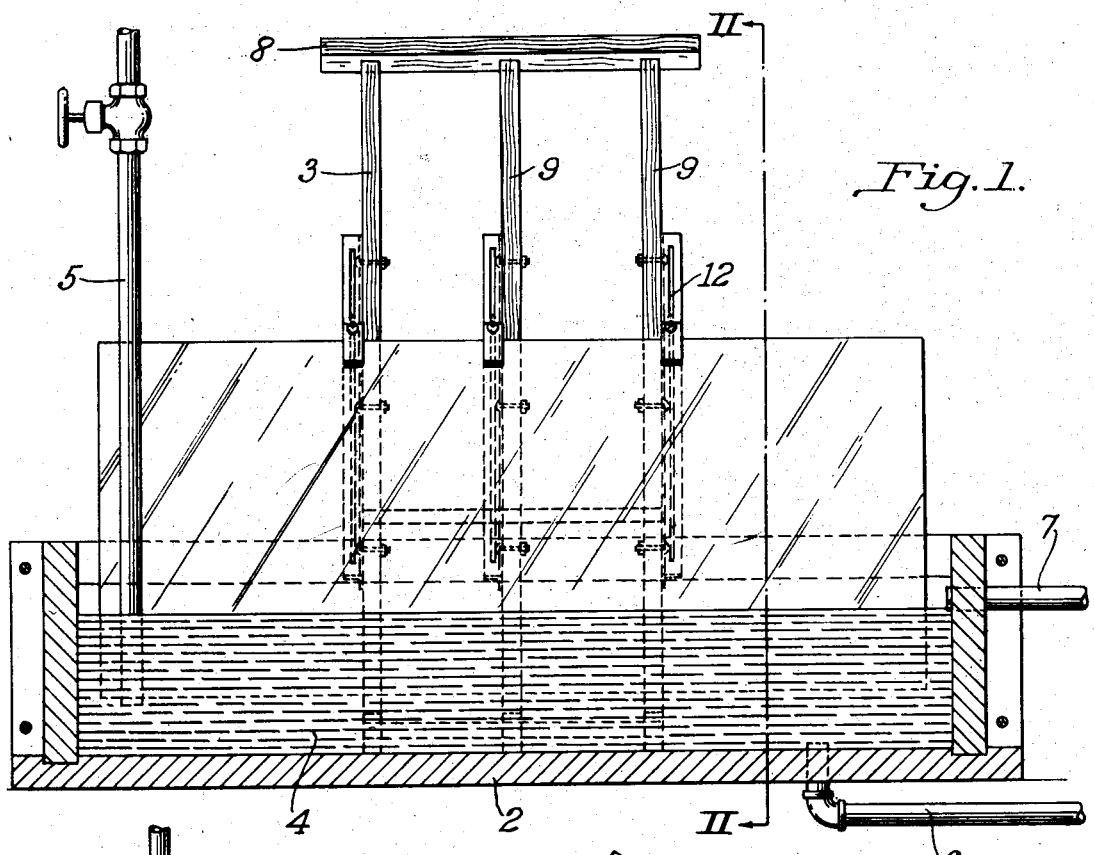
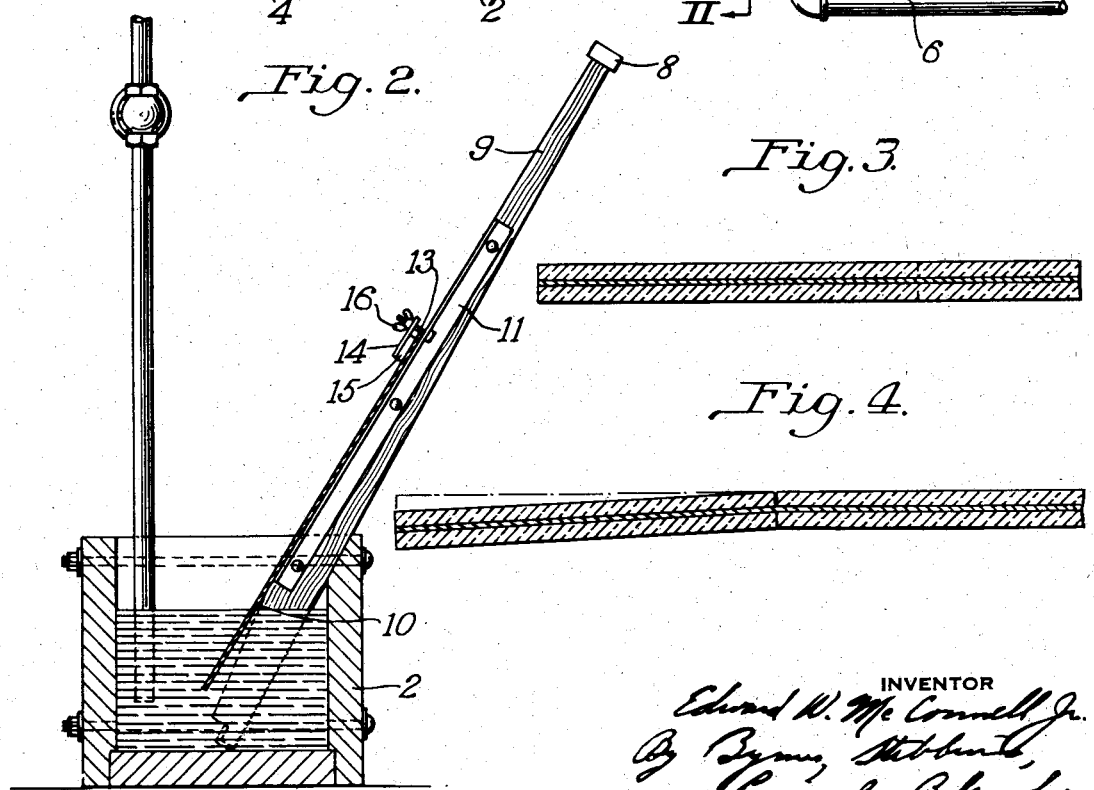

Patented July 10, 1934

1,966,353

UNITED STATES PATENT OFFICE 1,966,353

METHOD OF CUTTING LAMINATED GLASS

Edward W. McConnell, Jr., Jeannette, Pa., assignor to American Window Glass Company, Jeannette, Pa., a corporation of Pennsylvania Application February 16, 1931, Serial No. 515,966

8 Claims. (Cl. 49—50)

This invention relates to glass cutting, and more particularly to a new and improved method and apparatus for the cutting of laminated glass.

By my invention, I provide a method for cutting laminated glass which can be practiced very economically in that it requires no elaborate or expensive apparatus and the cutting can be accomplished in a relatively short time. Furthermore, the method and apparatus which I provide obviates any difficulties heretofore encountered in the cutting of laminated glass except those which are due to mismating or poor scoring of the glass by the cutter.

In the accompanying drawing, in which I have shown for purposes of illustration only a preferred embodiment of my invention, Figure 1 is a front elevation of the apparatus which I provide, the tank being shown in section, showing a sheet of glass on the rack and partially immersed in the tank;

Figure 2 is a section taken along the line II—II of Figure 1;

Figure 3 is a section through a sheet of laminated glass showing the scores on each side of the membrane;

Figure 4 is a section of a sheet of laminated glass after it has been removed from the tank and before the membrane has been cut.

In the drawing there is shown a water tank 2 which is adapted to receive a rack 3 which is adapted to support a sheet of laminated glass. The tank is built of either wood or metal, or both, and is generally rectangular in shape. Water 4 is supplied to the tank by means of a pipe 5 which is connected to the ordinary hot water heater (not shown). The tank is provided at the bottom with a drain pipe 6 and also with a drain pipe 7 at the side, the latter of which is provided for the purpose of preventing the water level in the tank from rising above a predetermined point.

The rack 3 is built of wood and metal and is used for supporting the sheet of glass to be cut while the sheet is immersed in the tank 2. The rack is provided with a handle 8 and supporting members 9, the latter of which are adapted to support the sheet of glass. Each of the supporting members 9 is beveled, as at 10, in order to permit the portion of the sheet of laminated glass below the scores thereon to be depressed as the membrane of the sheet softens.

Clamping means is provided on each of the supporting members for the purpose of clamping thereon the sheet of glass being cut and immersed in the tank. The clamping means comprises an angle iron 11 having a slot 12 therein adapted to cooperate with and receive a bolt 13. A plate 14, having attached thereto a rubber block 15, is placed on the bolt 13 and fastened thereto by means of a wing nut 16.

In the cutting of a sheet of laminated glass, the sheet of glass is first scored with a diamond or wheel cutter on both sides of the membrane so as to give the required dimensions. The scores on opposite sides must be directly opposite each other and deep and continuous enough that the check will run along the score without experiencing any difficulties on the tapping of the glass. The glass is then tapped to separate the sheets along the score lines.

The sheet of glass is then placed on the rack 3 in such manner that the scores and the smaller portion of the glass is below the tapering points of the supporting struts. The glass is then clamped in this position by means of the clamping means above described.

The rack with the sheet of glass attached thereto is then immersed in the tank containing hot water. The depth of water in the tank should be such that the score will be covered. The rack with the attached sheet of glass is permitted to remain in the hot water from four to ten minutes. This time element is dependent upon the thickness of the glass, the immersion depth above the score, and the temperature of the water. In cutting off a 2" curved strip along the 44" side of a sheet of glass 14" x 14" which is .210" thick, it will require an immersion period of approximately five minutes when the sheet is placed in the tank at an angle of 60°, the score covered to a depth of 2" with water, and the temperature of the water is approximately 184° F.

While the sheet of glass is immersed in the water, the membrane will be softened and expand, and the portion of the glass below the scores will be depressed by its own weight.

The rack with the glass attached thereto is then removed from the water tank. If the glass below the scores has not sufficiently bent to permit the entrance of a knife blade for the purpose of cutting the membrane, a slight pressure is exerted on this portion of the glass and the cut thereby opened. A knife blade is then inserted in the opening and the membrane severed.

After the membrane has been cut, the cut edge should be externally sealed by the application of a coating of quick-drying lacquer. If the edges are to be ground and polished, the lacquering should not be done until after this operation has been performed.

As will be apparent to those skilled in the art, the method which I provide for the cutting of laminated glass is quite simple and economical. It will also be apparent that the apparatus is of an inexpensive character. Any difficulties experienced in the practice of the method of cutting laminated glass which I have described above will be due to mismated scoring or poor scoring. Other difficulties heretofore encountered in the cutting of laminated glass have been obviated by my invention.

While I have shown and described a preferred embodiment of my invention, it is to be understood that it is not to be limited thereby, but may be otherwise embodied or practiced within the scope of the following claims.

I claim:

1. The method of cutting laminated glass, comprising scoring the glass on each side of the membrane, said scores being substantially opposite each other, separating the glass along the score lines placing the portion of the sheet of glass adjacent the separation edges in a heated liquid, flexing the sheet, and cutting the membrane.

2. The method of cutting laminated glass, comprising scoring the glass sheets, separating the glass sheets along the score lines, placing the sheet adjacent the separation edges in a heated liquid for softening and expanding the membrane, and cutting the membrane.

3. The method of cutting laminated glass, comprising scoring the glass sheets along the score lines, placing the sheet adjacent the separation edges in a heated liquid for softening and expanding the membrane, flexing the sheet of laminated glass to admit a cutting element between the separated glass sheets, and cutting the membrane.

4. In the method of cutting laminated glass, the steps comprising scoring the glass on each side of the membrane, said scores being made substantially opposite each other, separating the glass along the score lines, placing it on a support so that the portion of the glass to one side of the separation edges is free of the support, heating the glass adjacent the separation edges by a heated liquid to soften and expand the membrane, flexing the glass to admit a cutting element between the separation edges, and cutting the membrane.

5. The method of cutting laminated glass, comprising cracking the glass sheets along the desired line of severance, and placing the sheet adjacent the line of severance in a heated liquid for softening and expanding the membrane to permit access to the membrane along the desired line of severance.

6. The method of cutting laminated glass, comprising cracking the glass sheets along the desired line of severance and placing the sheet adjacent the line of severance in a liquid for softening and expanding the membrane to permit access to the membrane along said line of severance.

7. The method of cutting laminated glass, comprising scoring the glass sheets, separating the glass sheets along the score lines, and subjecting the sheets adjacent the separation edges to a heated liquid for softening and expanding the membrane to permit access to the membrane along the separation edges.

8. The method of cutting laminated glass, comprising cracking the glass sheets along the desired line of severance, supporting the sheet so that the action of gravity upon the plate tends to separate the crack in one of said glass sheets, and subjecting the plate so supported to the action of a liquid for softening and expanding the membrane to permit access to the membrane along the desired line of severance.

EDWARD W. McCONNELL, Jr.